United States Patent [19]

Yamazaki et al.

[11] 3,763,316

[45] Oct. 2, 1973

[54] DYNAMIC FOCUSING CIRCUITS FOR CATHODE RAY TUBES

[75] Inventors: Eiichi Yamazaki, Ichihara; Yoshihiko Miyata, Mobara; Kosuke Kitamura, Yokohama, all of Japan

[73] Assignee: Hitachi Ltd., Tokyo, Japan

[22] Filed: July 31, 1972

[21] Appl. No.: 276,577

[30] Foreign Application Priority Data

Aug. 4, 1971 Japan ............................... 46/69127

[52] U.S. Cl. .......................... 178/7.5 R, 315/31 TV

[51] Int. Cl. ......................... H04n 3/18, H01j 29/56

[58] Field of Search .................. 178/7.5 R, DIG. 29; 315/31 R, 31 TV

[56] References Cited

UNITED STATES PATENTS 2,302,876 11/1942 Malling ............................ 178/7.5 R 2,621,305 12/1952 Little, Jr. et al. ............... 315/31 TV 2,458,891 1/1949 Boyle ............................ 315/31 TV

FOREIGN PATENTS OR APPLICATIONS 474,399 11/1937 Great Britain .................. 178/7.5 R

*Primary Examiner*—Robert L. Griffin

*Assistant Examiner*—George G. Stellar

*Attorney*—C. Yardley Chittick et al.

[57] ABSTRACT

In a dynamic focusing circuit adapted to compensate for the blooming of the focus caused by the variation in the beam current of a cathode ray tube, there is provided a peak value detector which comprises means for detecting the white peak of a video signal from a video signal amplifier, means for forming a compensation signal of a low frequency corresponding to the white peak value, and means for supplying the compensation signal to the focusing electrode of the cathode ray tube.

4 Claims, 4 Drawing Figures

DYNAMIC FOCUSING CIRCUITS FOR CATHODE RAY TUBES

BACKGROUND OF THE INVENTION

The present invention relates to a dynamic focusing circuit for use in cathode ray tubes.

In a cathode ray tube of the electrostatic focusing type an electron beam is focused by applying a suitable DC voltage upon a focusing electrode, but the voltage required for focusing varies dependent upon the magnitude of the electron beam current so that the voltage is not always constant. Generally, it is desirable to set the focusing voltage at a high level for a small beam current, whereas at a low level for a large beam current.

Generally, in the conventional cathode ray tube, since the focusing voltage is set to a definite value suitable for focusing a beam current of a relatively low value, when the beam current increases at bright portions or high light portions of the picture, the size of the spot increases rapidly above a certain value. Such a phenomenon is caused by the fact that the cross over position is shifted by the increase or decrease in the beam current and called as the blooming phenomenon. Creation of such a phenomenon at the high light portions of the picture impairs the quality of the picture and obstructs the view.

In order to eliminate this defect it has been proposed the so-called dynamic focusing method wherein a focusing voltage having a suitable value corresponding to the instantaneous value of the beam current is impressed upon the focusing electrode at any instant. This method, however, requires a high power video amplifier having a frequency band as wide as that of the video signal and can produce a high voltage of the order of several hundreds volts, thereby complicating the circuit construction and increasing the cost.

SUMMARY OF THE INVENTION

Accordingly, it is an object of this invention to provide an improved dynamic focusing circuit for use in a cathode ray tube.

Another object of this invention is to provide an improved dynamic focusing circuit which does not create blooming phenomenon at the high portions of the picture.

Still another object of this invention is to provide a dynamic focusing circuit of simple construction and of high utility.

A further object of this invention is to provide a novel dynamic focusing circuit capable of providing a compensation within the period of the field for the white peak value of the picture displayed on a picture tube.

According to this invention there is provided a dynamic focusing circuit adapted to compensate for the blooming of the focus caused by the variation in the beam current of a cathode ray tube characterized in that there is provided a peak value detector which comprises means for detecting the white peak of a video signal from a video signal amplifier, means for forming a compensation signal of a low frequency corresponding to the white peak value, and means for supplying the compensation signal to the focusing electrode of the cathode ray tube.

DESCRIPTION OF THE PREFERRED EMBODIMENT

Figure 1:
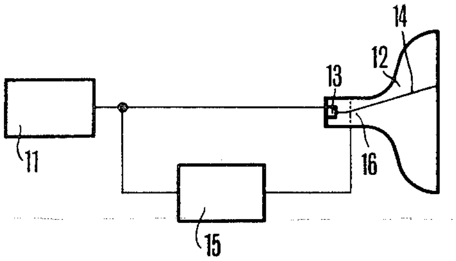
FIG. 1 is a block diagram of a dynamic focusing circuit embodying the invention.

In FIG. 1 of the accompanying drawing illustrating one example of the dynamic focusing circuit embodying the invention, there is shown a television picture tube 12 and minimum circuit components necessary to understand the invention. But it should be understood that actually there are many other well known circuit components. A video signal from a video signal amplifier 11 of a television receiver is applied to a cathode electrode 13 of the picture tube 12 for modulating an electron beam emanated from the cathode electrode in accordance with the brightness. At the same time, the video signal is also supplied to a peak value detector 15 which is constructed to detect the white peak value of the video signal for generating a compensation voltage corresponding to the white peak value detected. For example, when the white peak value is large, the compensation voltage is high thereby decreasing the focusing voltage. Conversely, when the white peak voltage is low, the compensation voltage is low, thereby increasing the focusing voltage.

Figure 2:
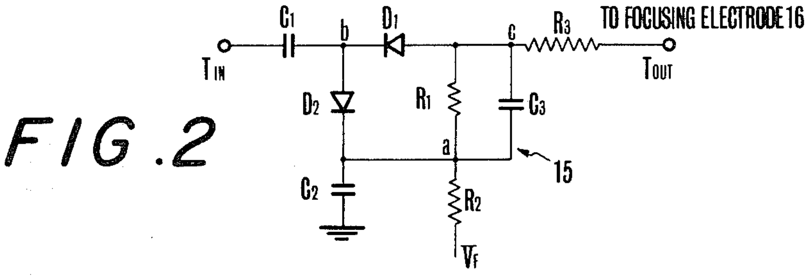
FIG. 2 is a connection diagram of one example of the peak value detection circuit shown in FIG. 1 and FIGS. 3A and 3B are curves to show the relationship between the video signal and the compensation signal which are useful to explain the operation of the detector circuit shown in FIG. 2.

The peak value detector 15 shown in FIG. 2 comprises a capacitor $C_1$, a diode $D_1$ and a resistor $R_3$ which are connected in series between an input terminal $T_{IN}$ and an output terminal $T_{OUT}$ which is connected to the focusing electrode 16 of the picture tube 12 (See FIG. 1). Serially connected diode $D_2$ and a capacitor $C_2$ are connected between the juncture *b* between capacitor $C_1$ and diode $D_1$ and the ground. A source of focusing voltage $V_F$ is connected to the juncture *c* between diode $D_1$ and resistor $R_3$ through serially connected resistors $R_2$ and $R_1$, a capacitor $C_3$ being connected in parallel with resistor $R_1$. The juncture *a* between resistors $R_1$ and $R_2$ is connected to the juncture between diode $D_2$ and capacitor $C_2$.

Figure 3A:
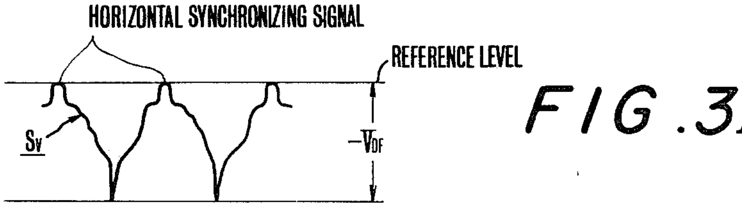
Figure 3B:
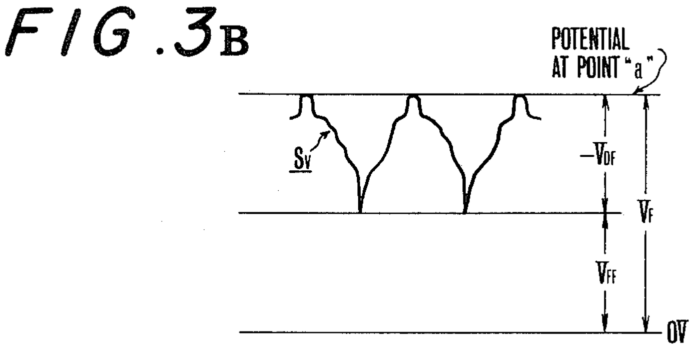

When a video signal shown in FIG. 3A is impressed upon the input terminal $T_{IN}$ of the peak value detector the peak value of this signal is clamped by the potential appearing at point *a* by the action of diode $D_2$ and capacitor $C_1$. Accordingly, the potential variation of point *b* with reference to the video signal will be shown by FIG. 3B, and the negative peak value $-V_{DF}$ at point B is detected by a circuit constituted by diode $D_1$, resistor $R_1$ and capacitor $C_3$, the detected peak value appearing across resistor $R_1$.

When the perviance of diodes $D_1$ and $D_2$ and the resistance value of resistor $R_1$ are selected properly and when the time constant determined by the values of resistor $R_1$ and capacitor $C_3$ is also selected properly, for example to be less than 0.016, it is possible to produce a desired focusing voltage $V_{FF}$ at point c. This voltage $V_{FF}$ is impressed upon the focusing electrode 16 of the picture tube 12 through resistor $R_3$ and output terminal $T_{OUT}$. With this connection, as the video signal $S_V$ increases, the beam current and voltage $-V_{DF}$ increase whereby the focusing voltage $V_{FF}$ is decreased. Conversely, as the video signal decreases the focusing voltage is increased. As an example, when $R_1$ = 1 meg ohms, $R_2$ = 1 meg ohms, $R_3$ = 0.5 ~ 1 meg ohms, $C_3$ = 0.016 μF, $C_2$ = 1,000 pF and $C_1$ = 100 pF the frequency of the signal appearing at the output terminal has a low frequency of less than 100 Hz.

When the output signal from the peak value detector 15 is impressed upon the focusing electrode 16, it is possible to compensate for the white peak value of the picture displayed on the picture tube 12 within the field period. Since the compensation is made mainly for the high light portions of the picture the focusing action for the black portions of the picture will be more or less deteriorated, this will cause any trouble.

Although the invention has been described in connection with a picture tube of the electrostatic focusing type it will be clear that the invention is also applicable to a picture tube of the electromagnetic focusing type. In the latter case, the correction voltage is expressed in terms of the correction current.

Further, it will be clear that the invention is also applicable to an ordinary cathode ray tube.

What is claimed is:

1. In a dynamic focusing circuit adapted to compensate for the blooming of the focus caused by the variation in the beam current of a cathode ray tube, the improvement which comprises a peak value detector including means for detecting the white peak of a video signal from a video signal amplifier, means for forming a compensation signal of a low frequency corresponding to said white peak value, and means for supplying said compensation signal to the focusing electrode of said cathode ray tube.

2. The dynamic focusing circuit according to claim 1 wherein said cathode ray tube is of the electrostatic focusing type and said correction signal is composed of the voltage component.

3. The dynamic focusing circuit according to claim 1 wherein said cathode ray tube is of the electromagnetic focusing type and said correction signal is composed of the current component.

4. The dynamic focusing circuit according to claim 1 wherein said peak value detector comprises an integrating circuit.

* * * * *